(12) United States Patent
Bapat (10) Patent No.: US 9,619,645 B2
(45) Date of Patent: Apr. 11, 2017

(54) AUTHENTICATION FOR RECOGNITION SYSTEMS

(71) Applicant: Spansion LLC, Sunnyvale, CA (US)

(72) Inventor: Ojas Bapat, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 124 days.

(21) Appl. No.: 13/856,671

(22) Filed: Apr. 4, 2013

(65) Prior Publication Data

US 2014/0303983 A1    Oct. 9, 2014

(51) Int. Cl.

| | | |
|---|---|---|
| *G10L 15/20* | (2006.01) | |
| *G05B 19/00* | (2006.01) | |
| *G06F 21/44* | (2013.01) | |
| *G10L 15/22* | (2006.01) | |
| *B60R 25/25* | (2013.01) | |
| *H04K 1/00* | (2006.01) | |
| *B60R 16/037* | (2006.01) | |
| *G10L 17/22* | (2013.01) | |

(52) U.S. Cl.
CPC .......... *G06F 21/44* (2013.01); *B60R 16/0373* (2013.01); *B60R 25/257* (2013.01); *G05B 19/00* (2013.01); *G10L 15/20* (2013.01); *G10L 15/22* (2013.01); *H04K 1/00* (2013.01); *G10L 17/22* (2013.01)

(58) Field of Classification Search
None
See application file for complete search history.

(56) References Cited

U.S. PATENT DOCUMENTS

| | | | | |
|---|---|---|---|---|
| 7,826,945 | B2 * | 11/2010 | Zhang | G06F 3/16 701/36 |
| 8,762,852 | B2 * | 6/2014 | Davis | G06Q 30/0201 700/94 |
| 2003/0231550 | A1 * | 12/2003 | Macfarlane | B60R 25/257 367/198 |
| 2005/0273626 | A1 * | 12/2005 | Pearson | G06Q 20/32 713/186 |
| 2007/0082706 | A1 | 4/2007 | Campbell et al. | |
| 2009/0089065 | A1 * | 4/2009 | Buck | B60R 16/0373 704/275 |

(Continued)

FOREIGN PATENT DOCUMENTS

| | | |
|---|---|---|
| JP | 2002-295086 A | 10/2002 |
| JP | 2003-114694 A | 4/2003 |

(Continued)

OTHER PUBLICATIONS

Co-pending U.S. Appl. No. 13/489,799, filed Jun. 6, 2012 (Not Published).

(Continued)

*Primary Examiner* — Jialong He
*Assistant Examiner* — Yi-Sheng Wang (57) ABSTRACT

Embodiments include a method, apparatus, and computer program product for authentication for speech recognition. The method can include sensing an authentication device with a target device. One or more decoded voice commands can be processed after verification of the authentication device by the target device. Further, one or more decoded voice commands can be executed by the target device.

19 Claims, 6 Drawing Sheets

(56) References Cited

U.S. PATENT DOCUMENTS

| | | | | |
|---|---|---|---|---|
| 2010/0222079 A1* | 9/2010 | Lee | ...................... | G01C 21/343 |
| | | | | 455/456.3 |
| 2013/0185072 A1* | 7/2013 | Huang | .................... | G10L 15/30 |
| | | | | 704/246 |
| 2013/0185078 A1* | 7/2013 | Tzirkel-Hancock | .... | G10L 15/22 |
| | | | | 704/275 |

FOREIGN PATENT DOCUMENTS

| | | |
|---|---|---|
| JP | 2004-325688 A | 11/2004 |
| JP | 4478146 B2 | 3/2010 |

OTHER PUBLICATIONS

Co-pending U.S. Appl. No. 13/725,260, filed Dec. 21, 2012 (Not Published).
International Search Report for International Application No. PCT/US2014/032674, mailed Jul. 31, 2014.
English language abstract of Japanese patent publication No. 2002-295086-A.
English language abstract of Japanese patent No. 4478146-B2.
English language abstract of Japanese patent publication No. 2004-325688-A.
English language abstract of Japanese patent publication No. 2003-114694-A.
Written Opinion of the International Searching Authority for International Application No. PCT/US2014/032674 dated Jul. 31, 2014; 7 pages.
JP Office Action for Application No. 2016-506582 dated Jan. 10, 2017; 5 pages.

* cited by examiner

AUTHENTICATION FOR RECOGNITION SYSTEMS

BACKGROUND

Field

Embodiments included herein generally relate to authentication for recognition systems. More particularly, embodiments relate to a data pattern recognition system that authenticates a user to a target device based on an authentication device paired with the target device.

Background

Real-time data pattern recognition is increasingly used to analyze data streams in electronic systems. On a vocabulary with over tens of thousands of words, speech recognition systems have achieved improved accuracy, making it an attractive feature for electronic systems. For example, speech recognition systems are increasingly common in consumer markets targeted to data pattern recognition applications such as, for example, the mobile device, server, PC, and automobile markets.

One challenge in speech recognition systems is the authentication of a user to an intended target device. For example, biometric technology can be used to authenticate the user to the intended target device based on the user's voice characteristics. However, fluctuations in the user's voice over time and in different environments (e.g., noisy versus quiet environments) can cause errors in biometric-based authentication systems.

SUMMARY

Therefore, there is a need for authentication of a user to an intended target device that addresses the above issues with biometric and other authentication technologies.

An embodiment includes a method for authentication for speech recognition. The method includes sensing an authentication device with a target device. One or more decoded voice commands can be processed after verification of the authentication device by the target device. Further, the one or more decoded voice commands can be executed by the target device.

Another embodiment includes an authentication apparatus for speech recognition. The authentication apparatus includes a speech recognition engine, an authentication module, and a command module. The authentication module is configured to sense an authentication device. The command module is configured to process one or more decoded voice commands after a verification of the authentication device.

A further embodiment includes a computer program product for authentication for speech recognition. The computer program product includes a tangible computer readable medium having stored therein one or more sequences of one or more instructions for execution by one or more processors to perform a method for authentication for speech recognition. The method includes the following: sensing an authentication device with a target device; processing one or more decoded voice commands after a verification of the authentication device by the target device; and, executing the one or more decoded voice commands at the target device.

Further features and advantages of the embodiments disclosed herein, as well as the structure and operation of the embodiments, are described in detail below with reference to the accompanying drawings. It is noted that the invention is not limited to the specific embodiments described herein. Such embodiments are presented herein for illustrative purposes only. Additional embodiments will be apparent to person skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the scope of the invention. Rather, the scope of the invention is defined by the appended claims.

It would be apparent to a person skilled in the relevant art that the embodiments, as described below, can be implemented in many different forms of software, hardware, firmware, and/or the entities illustrated in the figures. Thus, the operational behavior of the embodiments disclosed herein will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of a person skilled in the relevant art to effect such feature, structure, or characteristic in connection with other embodiments whether or not explicitly described.

1. Exemplary Authentication Environment

Figure 1:
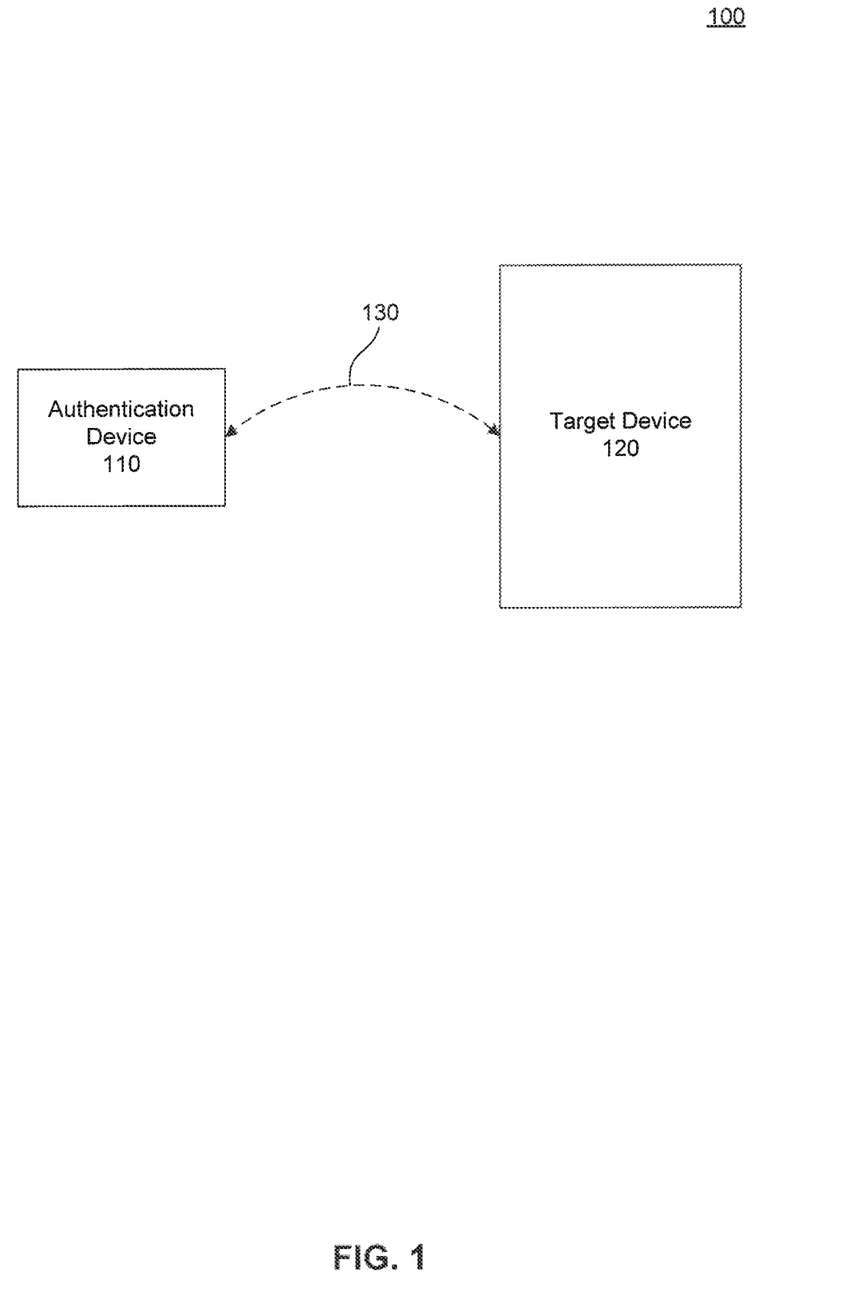
FIG. 1 is an illustration of an exemplary authentication environment in which embodiments, or portions thereof, can be implemented.

FIG. 1 is an illustration of an exemplary authentication environment 100 in which embodiments, or portions thereof, can be implemented. Authentication environment 100 includes an authentication device 110 and a target device 120. Authentication device 110 can communicate with target device 120 via a wireless communication link 130. A purpose, among others, of authentication environment 100 is to ensure that commands and/or control signals from authentication device 110 are intended, or authenticated, for target device 120.

Authentication device 110 can be, tot example and without limitation, a smart card, a radio frequency identification (RFID) device, a mobile device, a smart key device, other similar types of electronic devices, or a combination thereof. A smart card is a pocket-sized card with embedded integrated circuits designed for, among other things, identification and authentication applications. Smart cards can operate with both contact and contactless readers. An RFID device uses radio frequency electromagnetic fields to transfer data to a reader over a wireless communication platform (e.g., wireless communication link 130 of FIG. 1). A mobile device such as, for example, a mobile phone or personal digital assistant (PDA) can be used to transfer data over a short-range wireless technology platform. These short-range wireless technology platforms include, among others, infrared, Bluetooth, and Wi-Fi that can be implemented using wireless communication link 130. Further, a smart key device is an electronic access and authorization system commonly used in automobiles. For example, the smart key allows a driver to keep a key fob (which houses the smart key) in his/her pocket when unlocking, locking, and/or starting the automobile. The smart key can include a radio pulse generator that produces a signal received by one or more antennas housed in the automobile. The signal received by the one or more antennas can be communicated over a wireless communication link such as, for example, wireless communication link 130 of FIG. 1.

Target device 120 is an intended target device for authentication device 110 and can be, for example and without limitation, an automobile, a home, an office, other similar types of environments that can be controlled by authentication device 110, or a combination thereof. These environments can include a reader and/or an antenna that receives or senses the signal transmitted by authentication device 110. Methods of receiving and sensing signals transmitted by authentication device 110 (e.g., smart card, RFID, and smart key) are known to a person skilled in the relevant art.

Figure 2:
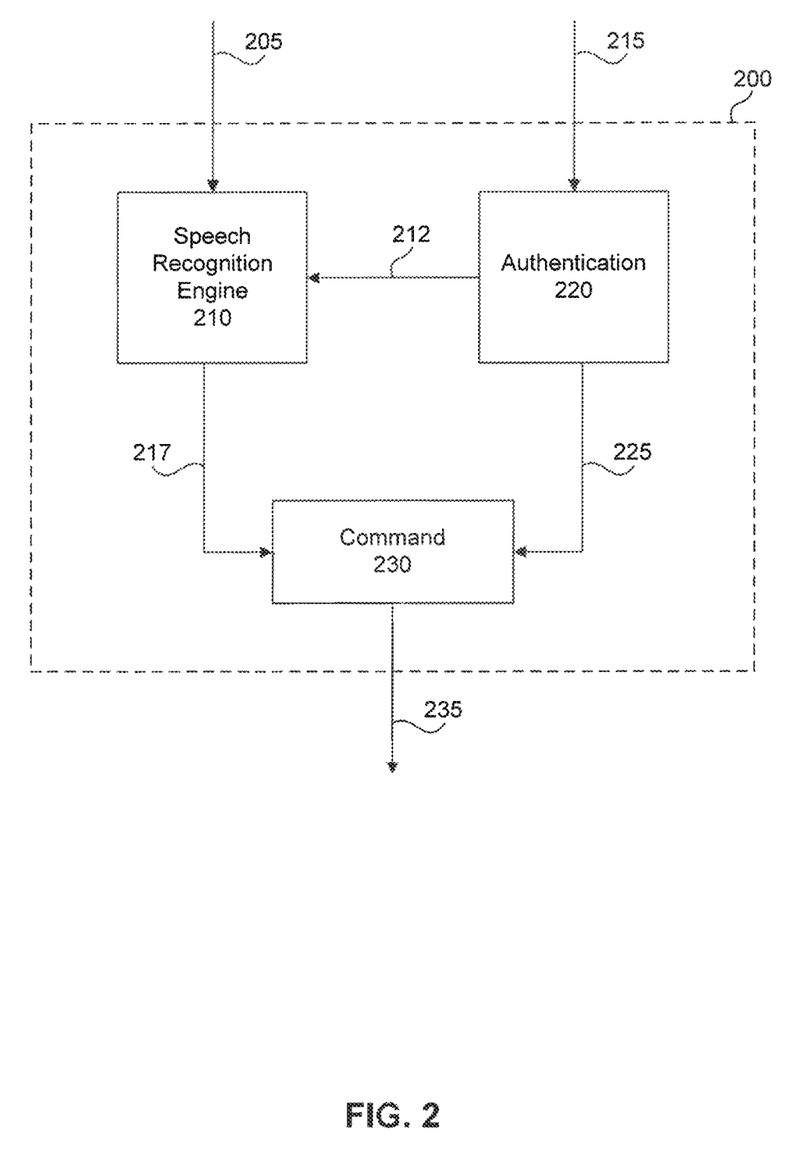
FIG. 2 is an illustration of an embodiment of an authentication apparatus for speech recognition.
Figure 3:
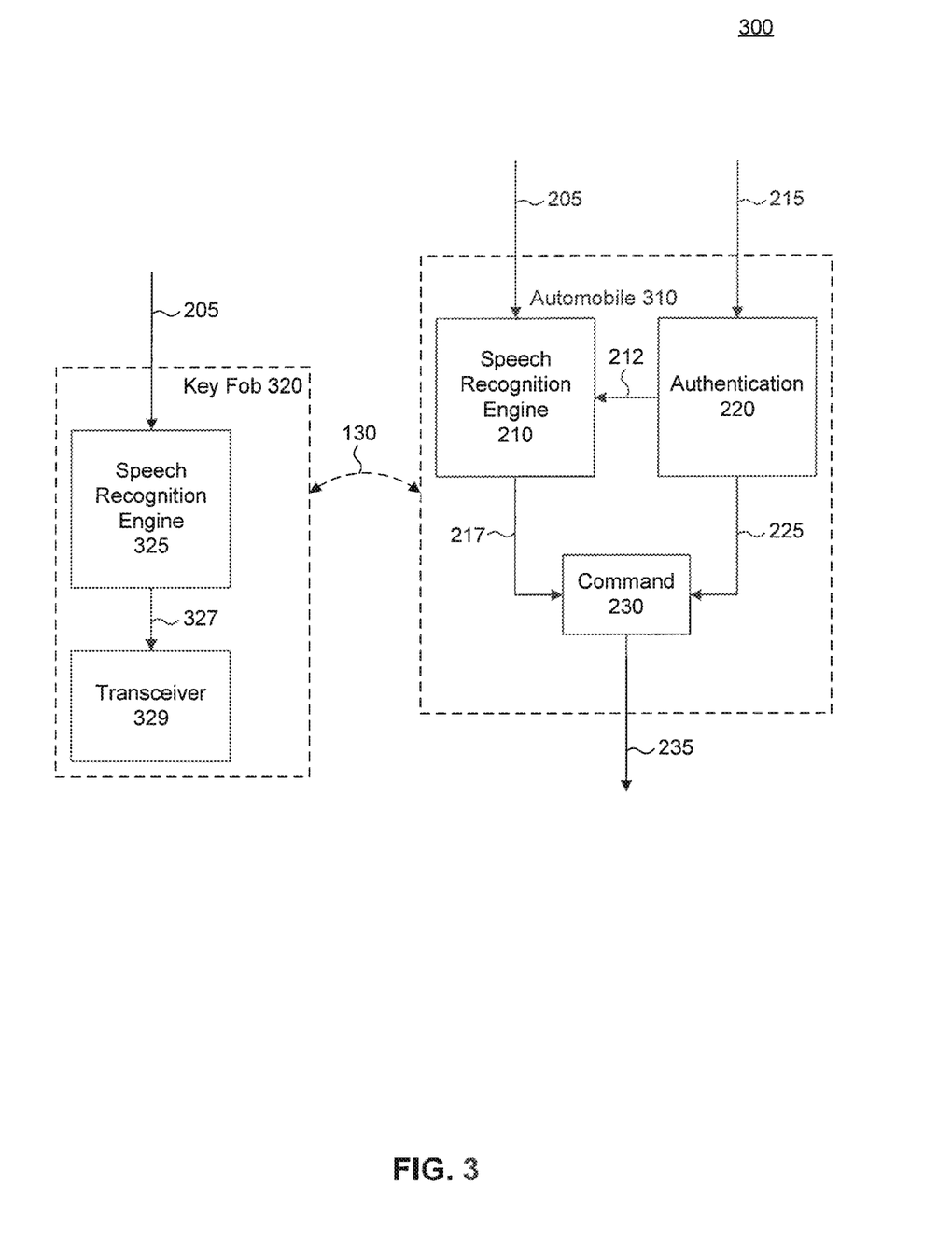
FIG. 3 is an illustration of an exemplary automobile environment in which embodiments, or portions thereof, can be implemented.
Figure 4:
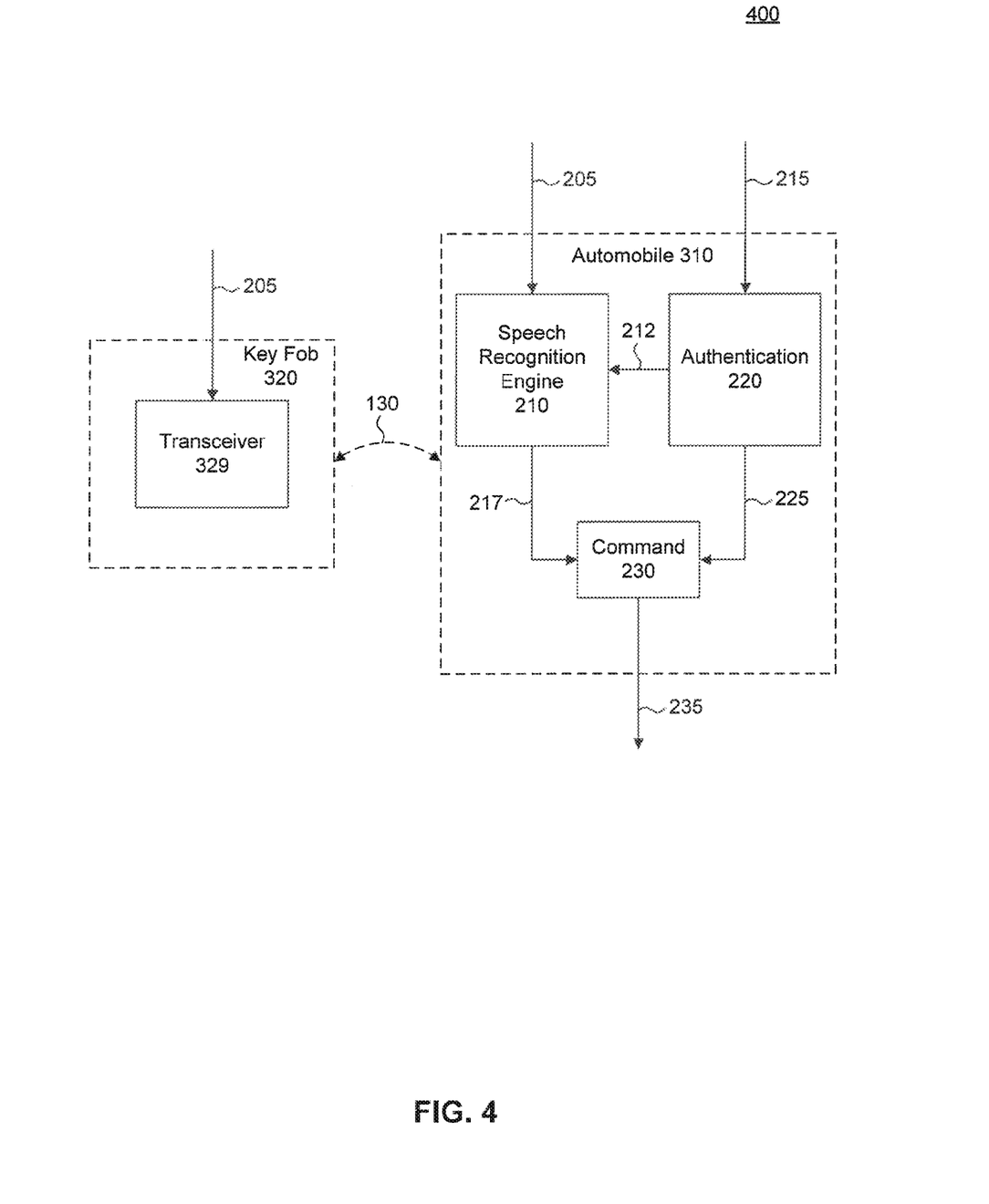
FIG. 4 is an illustration of another exemplary automobile environment in which embodiments, or portions thereof, can be implemented.

The following descriptions of FIGS. 2-4 are based on an automobile environment in which the automobile is a target device (e.g., target device 120 of FIG. 1) and a key fob associated with the automobile is an authentication device (e.g., authentication device 110 of FIG. 1). Based on the description herein, a person skilled in the relevant art will recognize that the embodiments disclosed herein can be applied to other types of environments such as, for example and without limitation, other types of vehicles, a home, and an office. These other types of environments are within the spirit and scope of the embodiments disclosed herein.

2. Embodiments of Authentication for Speech Recognition

FIG. 2 is an illustration of an embodiment of an authentication apparatus 200 for speech recognition. Authentication apparatus 200 includes a speech recognition engine 210, an authentication module 220, and a command module 230. Speech recognition engine 210 receives a voice command 205 and outputs a decoded voice command 217 to command module 230. Authentication module 220 receives an authorization signal 215 and outputs an activation signal 212 and an authentication signal 225. In an embodiment, activation signal 212 activates speech recognition engine 210 when an authentication device (e.g., authentication device 110 of FIG. 1) is authenticated/paired with a target device (e.g., target device 120). Authentication signal 225 is an input to command module 230 and represents whether the authentication device has been properly authenticated/paired with the target device. Based on decoded voice command 217 and authentication signal 225, command module 230 outputs a command signal 235 to the target device.

Authentication apparatus 200 can be implemented in authentication environment 100 of FIG. 1. In an embodiment, authentication apparatus 200 can be implemented in authentication device 110 of FIG. 1, in which authentication apparatus 200 transmits command signal 235 to target device 120 over wireless communication link 130 of FIG. 1. In another embodiment, authentication apparatus 200 can be implemented in target device 120, in which authentication apparatus 200 receives authorization signal 215 over wireless communication link 130 and receives voice command 205. In yet another embodiment, authentication apparatus 200 can be implemented in both authentication device 110 and target device 120. For example, speech recognition engine 210 can be implemented in authentication device 110, in which speech recognition engine 210 transmits decoded voice command 217 to target device 120 over wireless communication link 130. Further, authentication module 220 and command module 230 can be implemented in target device 120. In this example, activation signal 212 can be optional.

As noted above, the descriptions of FIGS. 2-4 are based on an automobile environment in which the automobile is a target device (e.g., target device 120 of FIG. 1) and a key fob (housing a smart key) associated with the automobile is an authentication device (e.g., authentication device 110 of FIG. 1). FIG. 3 is an illustration of an exemplary automobile environment 300 in which embodiments, or portions thereof, can be implemented. Speech recognition engine 210, authentication module 220, and command module 230 of FIG. 2 are implemented in an automobile 310 and a speech recognition engine 325 is implemented in a key fob 320. Key fob 320 can communicate with automobile 310 via a transceiver 329 over wireless communication link 130.

Automobile 310 includes one or more antennas configured to receive a decoded voice command 327 from key fob 320 (via transceiver 329) and authorization signal 215. Further, each of automobile 310 and key fob 320 includes one or more microphones (not shown in FIG. 3) to receive voice command 205 for further processing by speech recognition engine 210 and speech recognition engine 325.

FIG. 4 is an illustration of another exemplary automobile environment 400 in which embodiments, or portions thereof, can be implemented. Similar to automobile environment 300, speech recognition engine 210, authentication module 220, and command module 230 of FIG. 2 are implemented in automobile 310 and transceiver 329 is implemented in key fob 320. Key fob 320 can communicate with automobile 310 via transceiver 329 over wireless communication link 130.

Automobile 310 includes one or more antennas configured to receive voice command 205 from key fob 320 (via transceiver 329) and authorization signal 215. Further, each of automobile 310 and key fob 320 includes one or more microphones (not shown in FIG. 4) to receive voice command 205 for further processing by speech recognition engine 210. Based on the description herein, a person skilled in the relevant art will recognize that automobile 310 and key fob 320 can include different configurations of speech recognition engines, authentication modules, command modules, and microphones.

Figure 5:
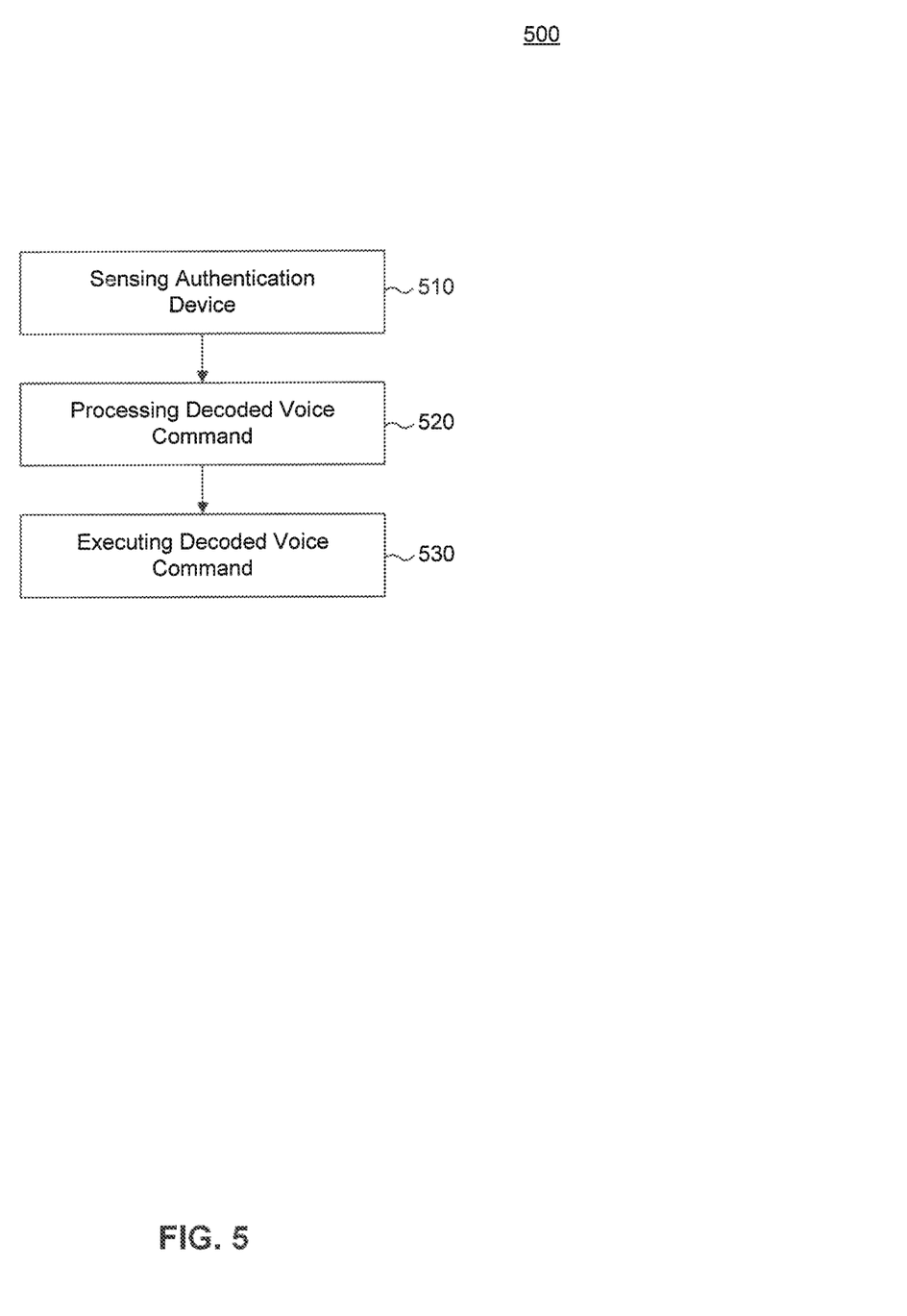
FIG. 5 is an illustration of an embodiment of a method for authentication for speech recognition.

FIG. 5 is an illustration of an embodiment of a method 500 for authentication for speech recognition. Method 500 can be performed using, for example, automobile environment 300 of FIG. 3 and automobile environment 400 of FIG. 4.

In step 510, an authentication device is sensed by a target device. In reference to FIGS. 3 and 4, key fob 320 can be sensed by automobile 310 when it is within detection range (e.g., 2 to 3 meters). For example, key fob 320 can transmit authorization signal 215 via transceiver 329 over wireless communication link 130. Authorization signal 215 can be generated by a radio pulse generator (not shown in FIGS. 3 and 4) embedded in key fob 320 and include an identification or authorization code used by automobile 310 to authenticate key fob 320. In an embodiment, authentication module 220 receives authorization signal 215 and authenticates key fob 320—e.g., verifies that key fob 320 is properly paired with automobile 310.

In an embodiment, after authentication module 220 receives authorization signal 215 and authenticates key fob 320, authentication module 220 sends activation signal 212 to speech recognition engine 210. Authentication module 220 can also send activation signal 212 to speech recognition engine 325 via wireless communication link 130, according to an embodiment. In an embodiment, activation signal 212 activates or engages speech recognition engine 210 and speech recognition engine 325. Further, authentication module 220 sends authentication signal 225 to command module 230 to indicate that key fob 320 has been properly authenticated/paired with automobile 310.

In step 520, one or more decoded voice commands are processed after the authentication device has been verified by the target device. In reference to FIG. 3, once activated, speech recognition engine 210, speech recognition engine 325, or both process voice command 205. Voice command 205 can be uttered by a user of key fob 320 (e.g., driver or passenger of automobile 310). Speech recognition engine 210 and speech recognition engine 325 generate decoded voice command 217 and decoded voice command 327, respectively. Decoded voice command 327 can be transmitted from key fob 320 (via transceiver 329) to command module 230 using wireless communication link 130. In reference to FIG. 4, once activated, speech recognition 210 processes voice command 205. Here, speech recognition 210 generates decoded voice command 217.

In an embodiment, upon receiving voice command 205, speech recognition engine 210 and speech recognition engine 325 remove one or more ambient conditions from decoded voice command 217 and decoded voice command 327, respectively. The removal of these ambient conditions include, among others, canceling noise, canceling echoes, removing reverberations, or a combination thereof associated with voice command 205. It is beneficial, especially in an outdoor environment (e.g., parking lot, parking garage, nearby roads with heavy traffic), to remove the one or more ambient conditions such that speech recognition engine 210 and speech recognition engine 325 can accurately decode voice command 205.

Exemplary detail on speech recognition engine 210 and speech recognition engine 325 can be found in U.S. patent application Ser. No. 13/489,799, filed Jun. 6, 2012, titled "Acoustic Processing Unit," and U.S. patent application Ser. No. 13/725,260, filed Dec. 21, 2012, titled "Phoneme Score Accelerator," which are both incorporated herein by reference in their entireties.

In reference to the example of FIG. 3, after command module 230 receives authentication signal 225 that indicates that key fob 320 has been properly authenticated/paired with automobile 310, command module 230 determines whether decoded voice command 217 or decoded voice command 327 will be used for further processing, according to an embodiment. Command module 230 can make this determination based on whether key fob 320 is within a predetermined distance from automobile 310, according to an embodiment. For example, key fob 320 can be within detection range (e.g., 2 to 3 meters) of automobile 310. However, due to ambient conditions (e.g., noise from a parking lot or nearby highway), the one or more microphones associated with automobile 310 may not be able to accurately sense voice command 205. On the other hand, if a user utters voice command 205 while holding key fob 320 nearby, then the one or more microphones associated with key fob 320 are more likely to accurately sense voice command 205 than the one or more microphones associated with automobile 310. In an embodiment, if key fob 320 is within a predetermined distance from automobile 310 (e.g., 0.5 to 3.0 meters), then command module 230 selects decoded voice command 327 for further processing. For distances less than the predetermined distance from automobile 310 (e.g., <0.5 meters), command module 230 selects decoded voice command 217 for further processing, according to an embodiment.

In reference to FIG. 4, after command module 230 receives authentication signal 225 that indicates that key fob 320 has been properly authenticated/paired with automobile 310, speech recognition engine 210 determines whether voice command 205 received by key fob 320 (and transmitted to automobile 31(i via transceiver 329 and communication link 130) or voice command 205 received by automobile 310 will be used for further processing, according to an embodiment. Similar to above, speech recognition engine 210 can make this determination based on whether key fob 320 is within a predetermined distance from automobile 310, according to an embodiment. For example, key fob can be within detection range (e.g., 2 to 3 meters) of automobile 310. However, due to ambient conditions (e.g., noise from a parking lot or nearby highway), the one or more microphones associated with automobile 310 may not be able to accurately sense voice command 205. On the other hand, if a user utters voice command 205 while holding key fob 320 nearby, them the one or more microphones associated with key fob 320 are more likely to accurately sense voice command 205 than the one or more microphones associated with automobile 310. Here, voice command 205 from key fob 320 is processed by speech recognition 210 into decoded voice command 217.

In reference to FIG. 3, in another embodiment, command module 230 determines whether decoded voice command 217 or decoded voice command 327 will be used for further processing based on whether key fob 320 is located inside or outside of automobile 310. Automobile 310 can have, for example, one or more sensors to assist command module 230 determine whether key fob 320 is inside automobile 310. For example, if an ignition of the automobile has been started, one or more doors have been unlocked, or a parking brake has been disengaged, then command module 230 can determine that key fob 320 (and the user of key fob 320) is inside automobile 310. In an embodiment, if key fob 320 is inside automobile 310, then command module 230 selects decoded, voice command 217 over decoded voice command 327 for further processing.

In reference to FIG. 4, in another embodiment, speech recognition engine 210 determines whether voice command 205 received by key fob 320 (and transmitted to automobile 310 via transceiver 329 and communication link 130) or voice command 205 received by automobile 310 will be used for further processing. Similar to above, speech recognition engine 210 can make this determination based on whether key fob 320 is located inside or outside of automobile 310. In an embodiment, if key fob 320 is inside automobile 310, then speech recognition engine 210 selects voice command 205 received by automobile 310 for further processing Command module 230 can also filter voice commands from unauthorized users, according to an embodiment. Command module 230 can apply a learning algorithm to identify one or more authorized users. For example, upon setup of the speech recognition system in automobile environment 300 of FIG. 3 and automobile environment 400 of FIG. 4, command module 230 can learn different voice characteristics of one or more authorized users. Based on these voice characteristics, command module 230 is able to discern voice commands of authorized users from voice commands of unauthorized users.

Further, in an embodiment, command module 230 can adjust a probability threshold of matching voice command 205 with an authorized user based on a location of key fob 320. For example, command module 230 lowers the probability threshold that voice command 205 is from an authorized user when key fob 320 is inside automobile 310 as compared to when key fob 320 is outside automobile 310. This is because, for example, voice command 205 is less likely to be affected by noise and other ambient conditions when uttered inside automobile 310 as compared to when uttered outside automobile 310. Also, the authorized user is more likely to be inside automobile 310 than outside automobile 310.

In an embodiment, command module 230 can apply a learning algorithm to help discern a decoded voice command—e.g., decoded voice command 217 and decoded voice command 327 of FIGS. 3 and 4—based on past events. The learning algorithm can incorporate one or more past decoded utterances from a user, according to an embodiment. For example, in the past, a user may have said "Turn on light," in which automobile 310 has more than one light. In an embodiment, command module 230 may have requested clarification from the user on which light to turn on—e.g., headlights, interior lights, or dashboard console lights. Here, the user may have responded by uttering "Interior lights." Based on the user's past clarifications, command module 230 learns to turn on the user's preferred light source—e.g., the interior lights—the next time the user utters "Turn on light."

In reference to FIG. 5, in step 530, the one or mode decoded voice commands from step 520 are executed at the target device. In reference to FIGS. 3 and 4, decoded voice commands are outputted as command signal 235 from command module 230. These decoded voice commands can include, among others, opening a trunk compartment of the automobile, turning on lights, and adjusting driver and passenger seats (e.g., recline, move seat back for additional leg room, and fold down seats for easier access).

A benefit, among others, of the embodiments disclosed herein is the hands-free control and authentication process provided by authentication apparatus 200 of FIG. 2 and method 500 of FIG. 5. For example, in reference to the automobile example above, the key fob provides a means to authenticate a user of the key fob to the automobile. Further, once the key fob has been authenticated, the user can utter a voice command to be executed by the automobile (e start engine, turn on lights, unlock/lock doors, roll down windows, and open trunk compartment.)

3. Exemplary Computer System

Figure 6:
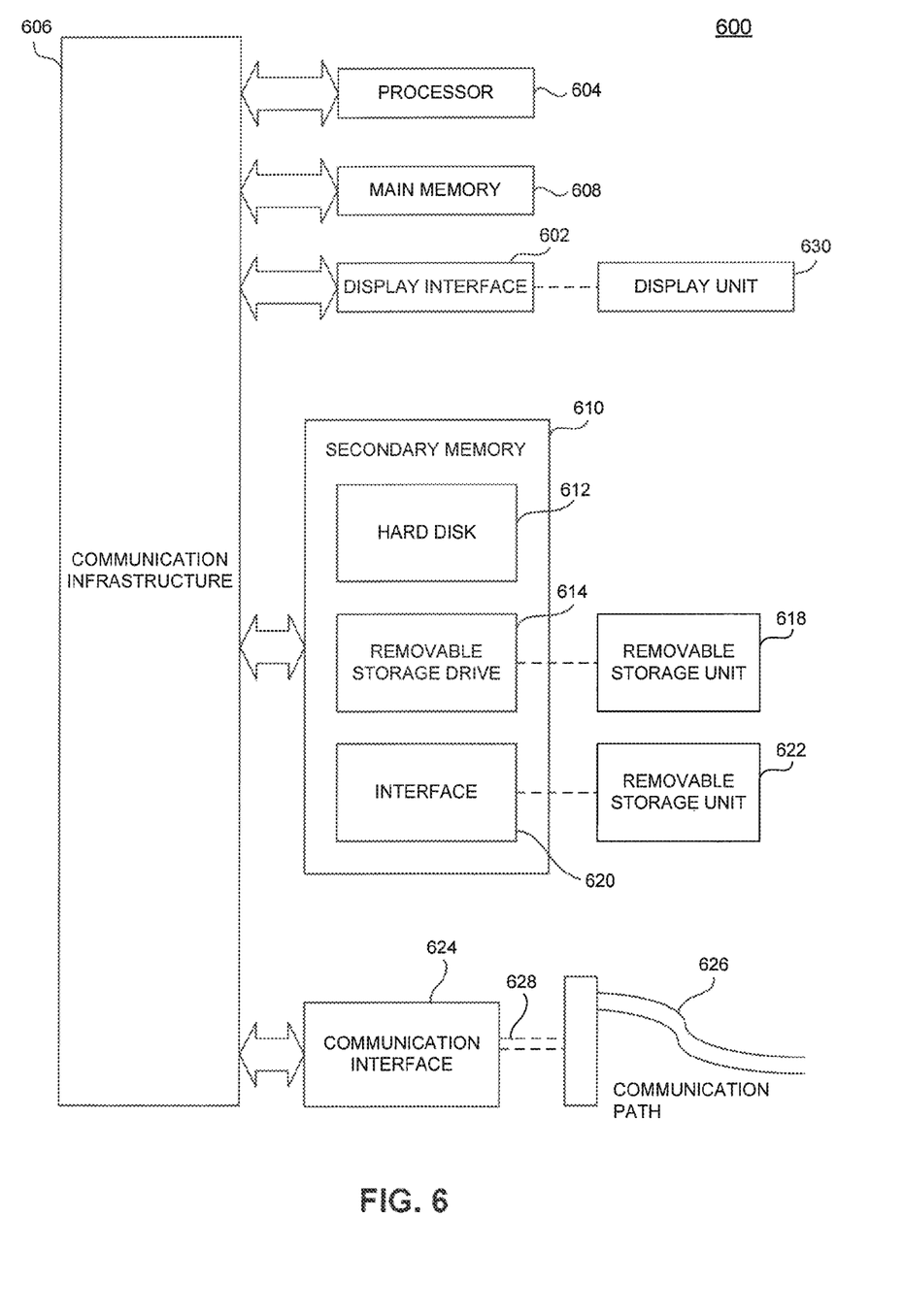
FIG. 6 is an illustration of an example computer system in which embodiments, or portions thereof, can be implemented as computer readable code Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

Various aspects of the embodiments disclosed herein may be implemented in software, firmware, hardware, or a combination thereof. FIG. 6 is an illustration of an example computer system 600 in which embodiments, or portions thereof, can be implemented as computer-readable code. For example, the method illustrated by flowchart 500 of FIG. 5 can be implemented in system 600. Various embodiments are described in terms of this example computer system 600. After reading this description, it will become apparent to a person skilled in the relevant art how to implement the embodiments disclosed herein using other computer systems and/or computer architectures.

It should be noted that the simulation, synthesis and/or manufacture of the various embodiments disclosed herein may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transformed to hardware as part of the production of integrated circuits.

Computer system 600 includes one or more processors, such as processor 604. Processor 604 may be a special purpose or a general-purpose processor such as, for example, speech recognition engine 210, authentication module 220, and command module 230 of FIG. 2. Processor 604 is connected to a communication infrastructure 606 (e.g., a bus or network).

Computer system 600 also includes a main memory 608, preferably random access memory (RAM), and may also include a secondary memory 610. Secondary memory 610 can include, for example, a hard disk drive 612, a removable storage drive 614, and/or a memory stick. Removable storage drive 614 can include a floppy disk drive, a magnetic tape drive, an optical disk drive, a flash memory, or the like. The removable storage drive 614 reads from and/or writes to a removable storage unit 618 in a well-known manner. Removable storage unit 618 can comprise a floppy disk, magnetic tape, optical disk, etc. which is read by and written to by removable storage drive 614. As will be appreciated by a person skilled in the relevant art, removable storage unit 618 includes a computer-usable storage medium having stored therein computer software and/or data.

Computer system 600 (optionally) includes a display interface 602 (which can include input and output devices such as keyboards, mice, etc.) that forwards graphics, text, and other data from communication infrastructure 606 (or from a frame buffer not shown) for display on display unit 630.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to tangible media such as removable storage unit 618, removable storage unit 622, and a hard disk installed in hard disk drive 612. Computer program medium and computer-usable medium can also refer to tangible memories, such as main memory 608 and secondary memory 610, which can be memory semiconductors (e.g., DRAMs, etc.). These computer program products provide software to computer system 600.

Computer programs (also called computer control logic) are stored in main memory 608 and/or secondary memory 610. Computer programs may also be received via communications interface 624. Such computer programs, when executed, enable computer system 600 to implement the embodiments disclosed herein. In particular, the computer programs, when executed, enable processor 604 to implement processes of the embodiments disclosed herein, such as the steps in the method illustrated by flowchart 500 of FIG. 5 can be implemented in system 600, discussed above. Accordingly, such computer programs represent controllers of the computer system 600. Where embodiments are implemented using software, the software can be stored in a computer program product and loaded into computer system 600 using removable storage drive 614, interface 620, hard drive 612, or communications interface 624.

Embodiments are also directed to computer program products including software stored on any computer-usable medium. Such software, when executed in one or more data processing device, causes a data processing device(s) to operate as described herein. The embodiments disclosed herein employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

4. Conclusion

It is to be appreciated that the Detailed Description section, and not the Summary and Abstract sections, is intended to be used to interpret the claims. The Summary and Abstract sections may set forth one or more but not all exemplary embodiments as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for authentication for speech recognition, the method comprising:
   sensing an authentication device with a target device;
   processing one or more decoded voice commands with the authentication device and the target device after a verification of the authentication device by the target device;
   executing the one or more decoded voice commands from the authentication device when a distance between the authentication device and the target device is greater than a predetermined distance from the target device; and
   executing the one or more decoded voice commands from the target device when the distance between the authentication device and the target device is less than the predetermined distance from the target device.

2. The method of claim 1, wherein the sensing comprises activating one or more speech recognition engines after the verification of the authentication device by the target device.

3. The method of claim 1, wherein the processing comprises receiving the one or more decoded voice commands at the target device.

4. The method of claim 1, wherein the processing comprises removing one or more ambient conditions from the one or more decoded voice commands.

5. The method of claim 4, wherein the removing comprises canceling noise, canceling an echo, removing reverberation, or a combination thereof from the one or more decoded voice commands.

6. The method of claim 1, wherein the processing comprises processing the one or more decoded voice commands based on a learning algorithm that incorporates one or more past decoded utterances.

7. The method of claim 6, wherein the processing the one or more decoded voice commands based on the learning algorithm comprises requesting user clarification when a plurality results are associated with the one or more decoded voice commands.

8. An authentication apparatus for speech recognition, the apparatus comprising:
 a speech recognition engine;
 an authentication module configured to sense an authentication device; and
 a command module configured to:
  process one or more decoded voice commands from the authentication device and the speech recognition engine after a verification of the authentication device;
  execute the one or more decoded voice commands from the authentication device when a distance between the authentication device and a target device associated with the speech recognition engine is greater than a predetermined distance from the target device; and
  execute the one of more decoded voice commands from the target device when the distance between the authentication device is less than the predetermined distance from the target device.

9. The authentication apparatus of claim 8, wherein the authentication device comprises at least one of a smart card, a radio frequency identification device, a mobile device, or a smart key device.

10. The authentication apparatus of claim 8, wherein the authentication device comprises:
 a transmitter configured to transmit one or more voice commands to the command module.

11. The authentication apparatus of claim 8, wherein the authentication module is configured to receive an authorization signal transmitted over a wireless communication link and the speech recognition engine is configured to receive one or more voice commands.

12. The authentication apparatus of claim 8, wherein the authentication module is configured to authenticate the authentication device based on an authorization signal transmitted over a wireless communication link and to output an activation signal to the speech recognition engine.

13. The authentication apparatus of claim 8, wherein the authentication device comprises a transmitter configured to transmit a first voice command to the speech recognition engine, and wherein the speech recognition engine is configured to receive a second voice command, the speech recognition engine configured to process either the first or the second voice command.

14. The authentication apparatus of claim 13, wherein the speech recognition engine is configured to process either the first or the second voice command based on a location of the authentication device.

15. The authentication apparatus of claim 8, wherein the command module is configured to process the one or more decoded voice commands based on a learning algorithm that incorporates past decoded utterances.

16. The authentication apparatus of claim 8, wherein the command module is configured to request user clarification when a plurality of results is associated with the one or more decoded voice commands.

17. A non-transitory computer readable medium having stored therein one or more sequences of one or more instructions for execution by one or more processors to perform a method for authentication for speech recognition, the method comprising:
 sensing an authentication device with a target device;
 processing one or more decoded voice commands by the authentication device and the target device after a verification of the authentication device by the target device; and
 executing the one or more decoded voice commands from the authentication device when a distance between the authentication device and the target device is greater than a predetermined distance from the target device; and
 executing the one or more decoded voice commands from the target device when the distance between the authentication device and the target device is less than the predetermined distance from the target device.

18. The non-transitory computer readable medium of claim 17, wherein the processing comprises selecting a first voice command from the authentication device or a second voice command from the target device based on a location of the authentication device relative to the target device.

19. The non-transitory computer readable medium of claim 17, wherein the processing comprises processing the one or more decoded voice commands based on a learning algorithm that incorporates one or more past decoded utterances.

* * * * *